US008229657B2

(12) United States Patent
Kim et al.

(10) Patent No.: US 8,229,657 B2
(45) **Date of Patent: *Jul. 24, 2012**

(54) METHOD AND APPARATUS FOR PROVIDING AND USING PUBLIC TRANSPORTATION INFORMATION

(75) Inventors: Young In Kim, Seoul (KR); Chu Hyun Seo, Seoul (KR); Sang O Park, Seoul (KR); Seung Won Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 232 days.

This patent is subject to a terminal disclaimer.

(21) Appl. No.: 12/303,761

(22) PCT Filed: Jun. 7, 2007

(86) PCT No.: PCT/KR2007/002737

§ 371 (c)(1), (2), (4) Date: Jul. 6, 2010

(87) PCT Pub. No.: WO2007/142460

PCT Pub. Date: Dec. 13, 2007

(65) Prior Publication Data

US 2010/0318285 A1 Dec. 16, 2010

Related U.S. Application Data

(60) Provisional application No. 60/804,231, filed on Jun. 8, 2006, provisional application No. 60/804,377, filed on Jun. 9, 2006, provisional application No. 60/807,908, filed on Jul. 20, 2006, provisional application No. 60/824,670, filed on Sep. 6, 2006, provisional application No. 60/867,947, filed on Nov. 30, 2006, provisional application No. 60/886,733, filed on Jan. 26, 2007.

(30) Foreign Application Priority Data

Jul. 13, 2006 (KR) ........................ 10-2006-0065843
Jul. 13, 2006 (KR) ........................ 10-2006-0065845

(51) Int. Cl.
*G06F 19/00* (2011.01)

(52) U.S. Cl. ......................... 701/117; 701/118; 340/994

(58) Field of Classification Search .................. 701/117, 701/118, 119; 340/988, 989, 994
See application file for complete search history.

(56) References Cited

U.S. PATENT DOCUMENTS 4,713,661 A 12/1987 Boone et al.
(Continued)

FOREIGN PATENT DOCUMENTS

KR 2001036842 A 5/2001

OTHER PUBLICATIONS

European Search Report dated for Nov. 20, 2009 for Application No. 07746846.0, 6 pages.

(Continued)

*Primary Examiner* — Gertrude Arthur Jeanglaude
(74) *Attorney, Agent, or Firm* — Fish & Richardson P.C.

(57) ABSTRACT

Disclosed herein is a method and apparatus for providing traffic information of public transportation means, such as a bus, and utilizing the provided information. A method of encoding public traffic information according to the present invention creates an identifier of bus information system, an ID of bus route, and travel time on each section wherein the section is link between neighboring two stops among bus stops pertaining to the bus route. The created information is organized to status information that is in turn incorporated into a transfer message. A sequence of transfer messages, each being constructed as described above, is wirelessly transmitted.

21 Claims, 17 Drawing Sheets

U.S. PATENT DOCUMENTS

| | | | | |
|---|---|---|---|---|
| 4,857,925 | A | 8/1989 | Brubaker | |
| 5,736,940 | A | 4/1998 | Burgener | |
| 6,006,159 | A | 12/1999 | Schmier et al. | |
| 6,952,645 | B1 | 10/2005 | Jones | |
| 7,928,864 | B2 * | 4/2011 | Park | 340/994 |
| 2006/0106536 | A1 | 5/2006 | Park | |

OTHER PUBLICATIONS

European Search Report dated for Nov. 20, 2009 for Application No. 07746843.7, 6 pages.

European Search Report dated for Nov. 20, 2009 for Application No. 07746841.1, 6 pages.

European Search Report dated for Nov. 23, 2009 for Application No. 07746836.1, 7 pages.

Kai Xia and Lina Xie, Chinese Office Action issued in Application No. 200780021286.X, on Mar. 15, 2010, and full translation, 14 pages.

Patrick Crechet, European Office Action issued in Application No. 07746841.1, on Jun. 8, 2010, 3 pages.

* cited by examiner

FIG. 3

| Ref. | Element | Description |
|---|---|---|
| | <bsi_message>:= | |
| | <intunli>(mid), | : Message ID |
| | <intunli>(ver), | : Version Number |
| 303 | <intunli> | : Length, n, of component data in bytes |
| 301 | <bitswitch>(selector), | : Message elements supplied |
| 302 | if(selector = xxxxxxx1) <time_t>, | : Message generation time |
| | if(selector = xxxxxx1x) <intunlo>, | : Reserved for future use |
| | if(selector = xxxxx1xx) <intunlo>, | : Reserved for future use |
| | if(selector = xxxx1xxx) <intunlo>, | : Reserved for future use |
| | if(selector = xxx1xxxx) <intunlo>, | : Reserved for future use |
| | if(selector = xx1xxxxx) <intunlo>, | : Reserved for future use |
| | if(selector = x1xxxxxx) <intunlo>, | : Reserved for future use |
| | if(selector = 1xxxxxxx) <bsi_components> | : Bus service information message components |

FIG. 4

| Element | Description |
|---|---|
| <bsi_components >:= | |
| <intunti>(n), | : Number of components |
| n*<bsi_component()>; | : Bus service information message component |

| Element | Description |
|---|---|
| <bsi_component(x) >:= | : Bus Service Information template |
| <intunti>(id), | : Identifier, id=x hex |
| <intunli>(n), | : Length, n, of component data in bytes |
| n*<byte>; | : Component data |

FIG. 6A

```
<bsi_component(80) >:=     : bus-stop-sequential-number-based bus information
<intunti>(id),             : Identifier, id=80 hex
<intunli>(n),              : Length, n, of component data in bytes
<bsi01>,                   : public transportation ID system identifier type
<intunlo>,                 : bus route ID
<intunti>(m),              : the number of buses running on the route
m*<bus_route_information_using_stop_sequential_number>;:
                                         bus route information element
```

601

```
<bus_route_information_using_stop_sequential_number>:= bus location
<intunti>;                 : Sequential number of bus stop
```

601a

```
<bus_route_information_using_stop_sequential_number>:= bus location
<intunti>,                 : Sequential number of bus stop
<intunli>;                 : predicted travel time to next bus stop (in seconds)
```

FIG. 6B

```
<bsi_component(81) >:=     : bus-stop-ID-based bus information
<intunti>(id),             : Identifier, id=81 hex
<intunli>(n),              : Length, n, of component data in bytes
<bsi01>,                   : public transportation ID system identifier type
<intunlo>,                 : bus route ID
<intunti>(m),              : the number of buses running on the route
m*<bus_route_information_using_stop_id>;: bus route information element
```

602

```
<bus_route_information_using_stop_id>:= bus location
<intunlo>;                 : bus stop ID
```

602a

```
<bus_route_information_using_stop_id>:= bus location
<intunlo>;                 : bus stop ID
<intunli>;                 : predicted travel time to next bus stop (in seconds)
```

FIG. 6C

<bsi_component(82) >:= : section-ID-based bus information
<intunti>(id), : Identifier, id=82 hex
<intunli>(n), : Length, n, of component data in bytes
<bsi01>, : public transportation ID system identifier type
<intunlo>, : bus route ID
<intunti>(m), : the number of buses running on the route
m*<bus_route_information_using_section_id>; bus route information element

603

<bus_route_information_using_section_id>:= bus location
<intunlo>; : section ID

603a

<bus_route_information_using_section_id>:= bus location
<intunlo>; : section ID
<intunli>; : predicted travel time to next bus stop (in seconds)

FIG. 6D

<bsi_component(83) >:= : bus-sequential-number-identifying-section-based bus information
<intunti>(id), : Identifier, id=83 hex
<intunli>(n), : Length, n, of component data in bytes
<bsi01>, : public transportation ID system identifier type
<intunlo>, : bus route ID
<intunti>(m), : the number of buses running on the route
m*<bus_route_information_using_section_of_stop_sequential_number>;

604

<bus_route_information_using_section_of_stop_sequential_number>:= bus location
<intunti>, : sequential number of start bus stop
<intunti>; : sequential number of end bus stop 604a <bus_route_information_using_section_of_stop_sequential_number>:= bus location
<intunti>, : sequential number of start bus stop
<intunti>; : sequential number of end bus stop
<intunli>; : predicted travel time to next bus stop (in seconds)

FIG. 6E

<bsi_component(84) >:= :
bus-stop-ID-identifying-section-based bus information
<intunti>(id), : Identifier, id=84 hex
<intunli>(n), : Length, n, of component data in bytes
<bsi01>, : public transportation ID system identifier type
<intunlo>, : bus route ID
<intunti>(m), : the number of buses running on the route
m*<bus_route_information_using_section_of_stop_id>; bus route information element

605

<bus_route_information_using_section_of_stop_id>:= bus location
<intunlo>, : ID of start bus stop
<intunlo>; : ID of end bus stop 605a <bus_route_information_using_section_of_stop_id>:= bus location
<intunlo>, : ID of start bus stop
<intunlo>; : ID of end bus stop
<intunli>; : predicted travel time to next bus stop (in seconds)

FIG. 6F

< bsi_component(85) >:= : section travel time
<intunti>(id), : Identifier, id=85 hex
<intunli>(n), : Length, n, of component data in bytes
<bsi01>, : public transportation ID system identifier type
<intunlo>, : bus route ID
<intunti>(m), : the number of bus stops pertaining to a bus route
m*<intunli>(travel_time); : travel time on each section
(in order of bus stops arranged in service direction)

FIG. 6G

| | |
|---|---|
| <bsi_component(86) >:= | : Additional information of bus route |
| <intunti>(id), | : Identifier, id=86 hex |
| <intunli>(n), | : Length, n, of component data in bytes |
| <bsi01>, | : public transportation ID system identifier type |
| <intunlo>, | : bus route ID |
| <short_string>(bus service name), | : bus service name |
| m*<additional_service_information()> | : additional service information |

FIG. 6H

| | |
|---|---|
| < additional_service_information(00) >:= | : route type |
| <intunti>(id), | : Identifier, id=00hex |
| <intunti>(n), | : Length, n, of component data in bytes |
| <intunti>(type); | : route type (e.g., main line, branch line,..) (different depending on service area) |

FIG. 6I

| | |
|---|---|
| < additional_service_information(01) >:= | : bus service company name |
| <intunti>(id), | : Identifier, id=01hex |
| <intunti>(n), | : Length, n, of component data in bytes |
| short_string; | : bus service company name |

FIG. 6J

611

| | |
|---|---|
| < additional_service_information(02) >:= | :scheduled time for the first & last buses |
| <intunti>(id), | : Identifier, id=02hex |
| <intunti>(n), | : Length, n, of component data in bytes |
| <specific_&_iterative_time>, | : scheduled time for the first bus |
| <specific_&_iterative_time>, | : scheduled time for the last bus |
| <dayselector>; | :day of a week to which the scheduled time applies |

612

FIG. 6K

| | |
|---|---|
| < additional_service_information(03) >:= | :bus operation interval 1 |
| <intunti>(id), | : Identifier, id=03hex |
| <intunti>(n), | : Length, n, of component data in bytes |
| <time_span>; | : bus operation interval |

FIG. 6L

```
< additional_service_information(04) >:=: bus operation interval 2
      in the event that bus operation interval varies depending on day of the week
or time of day
<intunti>(id),                    : Identifier, id=04hex
<intunti>(n),                     : Length, n, of component data in bytes
<bitswitch>(selector);
if(selector = xxxxxxx1) <dayselector>,  : day of the week
if(selector = xxxxxx1x) <specific_&_iterative_time>,: time of  a day
if(selector = xxxxx1xx) <time_span>;   :  bus operation interval
```

FIG. 6M

```
< additional_service_information(05) >:=          : a bus fare
<intunti>(id),                    : Identifier, id=05hex
<intunti>(n),                     : Length, n, of component data in bytes
<intunli>(fare);                  : bus fare (in Korean Won)
```

FIG. 6N

```
< additional_service_information(06) >:=          : turning point
<intunti>(id),                    : Identifier, id=06hex
<intunti>(n),                     : Length, n, of component data in bytes
<intunlo>(turning_point);         : ID of the turning point bus stop
```

FIG. 6O

```
< bsi_component(87) >:=    :  list of bus stops pertaining to a bus route
<intunti>(id),             : Identifier, id=87 hex
<intunli>(n),              : Length, n, of component data in bytes
<bsi01>,                   : public transportation ID system identifier type
<intunlo>,                 :  bus route ID
<intunti>(m),              :  the number of bus stops constituting a bus route
                            (assumed that the number is not greater than 255)
m*<intunlo>;               : IDs of bus stops constituting a bus route
                           (arranging order of bus stops is observed)
```

FIG. 7A

```
<specific_&_iterative_time>:=                    : time based on the present time
<bitswitch>(selector);
if(selector = 0xxxxxx1) <intunti>,    : Year,1..255 : year 2000~ 2254
if(selector = 0xxxxx1x) <intunti>,    : Month,    1..12: month
if(selector = 0xxxx1xx) <intunti>,    : Day,  1..31: day
if(selector = 0xxx1xxx) <intunti>,    : Hour,     1..24: hour+1
if(selector = 0xx1xxxx) <intunti>,    : Minute,   1..60: minute+1
if(selector = 0x1xxxxx) <intunti>,    : Second,   1..60: second+1
If(selector = 01xxxxxx)               : using the present date and time
If(selector = 10xxxxxx)               : indicative of repetition
```

FIG. 7B

```
<day_selector>:=              : represents one or more days of the week
<bitswitch>(selector);
if(selector = xxxxxxx1)       : Sunday
if(selector = xxxxxx1x)       : Monday
if(selector = xxxxx1xx)       : Tuesday
if(selector = xxxx1xxx)       : Wednesday
if(selector = xxx1xxxx)       : Thursday
if(selector = xx1xxxxx)       : Friday
if(selector = x1xxxxxx)       : Saturday
if(selector = 1xxxxxxx)       : the repetition of an event
```

FIG. 7C

```
<time_span>:=                            : Time Duration
<bitswitch>(selector);
if(selector = xxxxxxx1) <intunti>,       : Number of years
if(selector = xxxxxx1x) <intunti>,       : Number of months
if(selector = xxxxx1xx) <intunti>,       : Number of days
if(selector = xxxx1xxx) <intunti>,       : Number of hours
if(selector = xxx1xxxx) <intunti>,       : Number of minutes
if(selector = xx1xxxxx) <intunti>;       : Number of seconds
```

bsi01 Table

FIG. 8

| public transportation ID system identifier types | | |
|---|---|---|
| Code | Type | Description |
| 0 | unknown | |
| 1 | KS public transportation ID system | Public transportation ID system of Republic of Korea is used |
| 2 | City Seoul | Public transportation ID system of Seoul city is used |
| 3 | City Anyang | Public transportation ID system of Anyang city is used |
| 4 | City Bucheon | Public transportation ID system of Bucheon city is used |
| 5 | City Goyang | Public transportation ID system of Goyang city is used |
| 6 | Province Gyeonggi | Public transportation ID system of Gyeonggi province is used |
| 7 | City Incheon | Public transportation ID system of Incheon city is used |
| 8 | City Suwon | Public transportation ID system of Suwon city is used |
| 9 | City Gwacheon | Public transportation ID system of Gwacheon city is used |
| 10 | City Gunpo | Public transportation ID system of Gunpo city is used |
| 11 | City Cheonan | Public transportation ID system of Cheonan city is used |
| 12 | City Daejeon | Public transportation ID system of Daejeon city is used |
| 13 | City Jeonju | Public transportation ID system of Jeonju city is used |
| 14 | City Cheongju | Public transportation ID system of Cheongju city is used |
| 15 | City Daegu | Public transportation ID system of Daegu city is used |
| 16 | City Ulsan | Public transportation ID system of Ulsan city is used |
| 17 | City Masan | Public transportation ID system of Masan city is used |
| 18 | City Changwon | Public transportation ID system of Changwon city is used |
| 19 | City Busan | Public transportation ID system of Busan city is used |
| 20 | City Gimhae | Public transportation ID system of Gimhae city is used |
| 21 | City Weonju | Public transportation ID system of Weonju city is used |
| 22 | City Jeju | Public transportation ID system of Jeju city is used |
| - - - | End of Version 0.9 | |
| 255 | | |

FIG. 10A

| | |
|---|---|
| <bsi_component(88)> := | : Bus stop information |
| <intunti>(id), | : Identifier, id=88 hex |
| <intunli>(n), | : Length, n, of component data in bytes |
| <bsi01>, | : public transportation ID system identifier type |
| <intunli>(m), | : the number of bus stops (in a certain unit) |
| m*<bus_stop_information>; | : bus stop information element |

FIG. 10B

| | |
|---|---|
| <bus_stop_information(00)>:= | : Bus stop information |
| <intunti>(id), | : Identifer, id=00 hex |
| <intunli>(n), | : Length, n, of component data in bytes |
| <intunlo>, | : bus stop ID |
| m*<bus_stop_descriptor_component()>;: | |
| | bus stop detailed information component |

FIG. 10C

< bus_stop_descriptor_component(00) >:= : information on a bus to arrive at a bus stop
<intunti>(id), : Identifier, id=00 hex
<intunli>(n), : Length, n, of component data in bytes
<intunti>(m), : the number of buses to arrive at a bus stop
m*<arrival_bus>; : bus to arrive <arrival_bus>:= : information on a bus to arrive
<intunlo>(bus_route_id), : bus route ID
<time_span>(predicted_travel_time), : predicted arrival time
<current_bus_position>; : bus location <current_bus_position>:=: current bus location
<bitswitch>(selector), : indicative of location expressing method
if(selector=xxxxxxx1)
<bus_route_information_using_stop_sequential_number>, : see 601 of Fig. 6A
if(selector=xxxxxx1x)<bus_route_information_using_stop_id>, : see 602 of Fig. 6B
if(selector=xxxxx1xx)<bus_route_information_using_section_id>, : see 603 of Fig. 6C
if(selector=xxxx1xxx)
<bus_route_information_using_section_of_stop_sequential_number>, : see 604 of Fig. 6D
if(selector=xxx1xxxx) <bus_route_information_using_section_of_stop_id>; : see 605 of Fig. 6E

FIG. 10D

< bus_stop_descriptor_component(01) >:=: detailed information of a bus stop
<intunti>(id), : Identifier, id=01 hex
<intunli>(n), : Length, n, of component data in bytes
<short_string>(stop_name), : bus stop name
m*<additional_stop_information()>;: additional detailed information component

FIG. 10E

| | |
|---|---|
| < additional_stop_information(00) >:= | : coordinates of bus stop |
| <intunti>(id), | : Identifier, id=00 hex |
| <intunti>(n), | : Length, n, of component data in bytes |
| <location_point_component(00)>:= | : 5.3.1.2.4.2 WGS 84 on ISO/TS 18234-6:2006(E) document |

FIG. 10F

| | |
|---|---|
| <bsi_component(89)> := | : Additional Information |
| <intunti>(id), | : Identifier, id=89 hex |
| <intunli>(n), | : Length, n, of component data in bytes |
| <loc40>, | : country code |
| <loc41>, | : language code |
| <long_string>; | : additional information |

FIG. 11

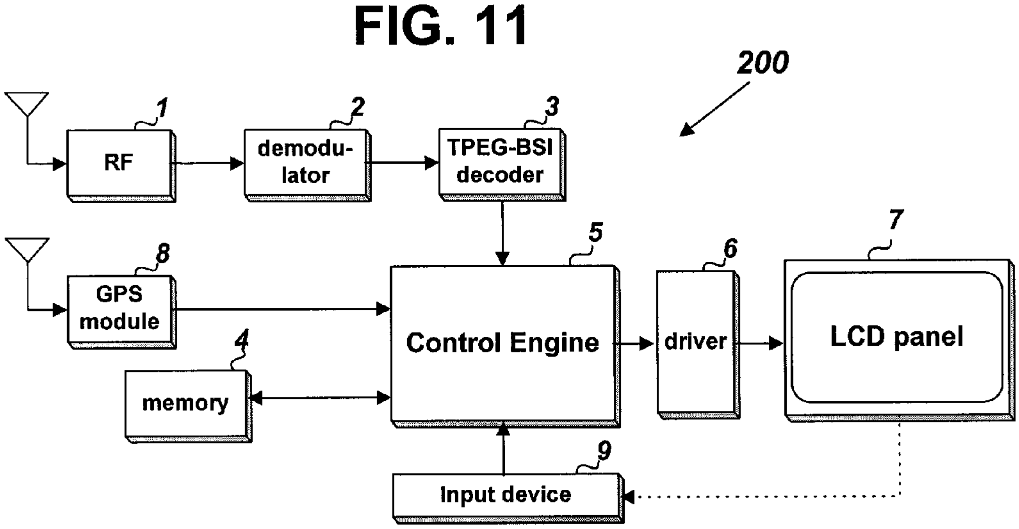

FIG. 12A

| Route (Line) ID | Bus Stop ID | Sequential Stop ID | travelling time on a section (min.) | Bus Location |
|---|---|---|---|---|
| B504 | Way in Guro Industrial Complex | 1 | - | No (0) |
| B504 | Gasan Elementary School | 2 | 4 | Yes (1) |
| ⋮ | ⋮ | ⋮ | ⋮ | ⋮ |
| R9404 | Subway Station Ori | 1 | - | No (0) |
| R9404 | Subway Station Migum | 2 | 3 | No (0) |
| R9404 | KT | 3 | 5 | pre-sect (2) |
| ⋮ | ⋮ | ⋮ | ⋮ | ⋮ |

1201 1202

FIG. 12B

| Bus Stop ID | Route (Line) ID | Sequential Stop ID | Predicted Arrival Time | Bus Location |
|---|---|---|---|---|
| 5-corners of Industrial Complex | B504 | 7 | 2:06PM | 0: 4-corners of Shinlim |
| 5-corners of Industrial Complex | G5528 | 10 | 1:51PM | 2: 5-corners of Industrial Complex - Gasan Elementary Sch. |
| ⋮ | ⋮ | ⋮ | ⋮ | ⋮ |
| Subway Station Gangnam | R9404 | 6 | 2:08PM | 3: Seohyeon St. - Sunae St. |
| Subway Station Gangnam | R9401 | 14 | 2:02PM | 4: Ori St. - Migum Elementary Sch. |
| ⋮ | ⋮ | ⋮ | ⋮ | ⋮ |

1211 1212

METHOD AND APPARATUS FOR PROVIDING AND USING PUBLIC TRANSPORTATION INFORMATION

1. TECHNICAL FIELD

The present invention relates to a method and apparatus for providing public transportation information and using the provided information.

2. BACKGROUND ART

With the advancement in digital signal processing and communication technologies, radio and TV broadcasts are in the process of being digitalized. Digital broadcast can provide various types of additional information (e.g., news, stock, weather, traffic information, etc) as well as audio and video contents.

Due to the increase in the number of vehicles in downtown areas and highways, traffic congestions take place frequently, which results in environmental pollution. To reduce traffic congestions and environmental pollution, the use of public transportation is encouraged. To promote the use of public transportation effectively, it should be guaranteed that public transportation is convenient and predictable. In the case of bus service, a major public transportation means, it is necessary to provide information on each bus route and changes in bus travel time depending on traffic volume.

Public transportation information requires a standard format because digital public transportation information should be received and interpreted in the same way by various terminals made by different manufacturers.

3. DISCLOSURE OF THE INVENTION

It is one object of the present invention to provide public transportation information so that users can obtain a real-time time table for buses available at any bus stop.

It is another object of the present invention to provide status information on public transportation means with less amount of data.

One exemplary embodiment of a method for encoding public transportation information according to the present invention creates a first component containing an information system identifier for identifying the bus information system, information for identifying a bus route, and information on the current location of each bus running on the bus route, creates a second component containing travel time along each of the sections constituting the bus route, constructs status information containing the first and second components, and incorporates the constructed status information into transfer messages.

Another exemplary embodiment of a method for encoding public transportation information according to the present invention creates an information system identifier for identifying the bus information system, information on the number of bus stops, and as many pieces of information on buses to arrive as the number of bus stops, creates status information containing the created information, and incorporates the creates status information into transfer messages.

One exemplary embodiment of a method for decoding public transportation information according to the present invention extracts status information from a received signal, extracts an information system identifier for identifying the bus information system, an identifier of a bus route, and information on the current location of each bus running on the bus route from a first component contained in the extracted status information, and extracts travel time along each of the sections constituting the bus route from a second component contained in the extracted status information.

Another exemplary embodiment of a method for decoding public transportation information according to the present invention extracts status information from a received signal, extracts an information system identifier for identifying the bus information system and information on the number of bus stops from the extracted status information, and extracts as many pieces of information on buses to arrive as the number of bus stops from the extracted status information.

In one embodiment, message management information containing the creation time of public transportation information as well as the status information is included in the transfer messages.

In one embodiment, the created information system identifier for identifying the bus information system, information on the number of bus stops, and as many pieces of information on buses to arrive as the number of bus stops are organized into one component and incorporated into the status information.

In one embodiment, a third component, which is different from the first and second components, including a bus route name, a bus route type, a bus service company name, the scheduled time for the first and last buses, information on bus operation interval, a bus fair, and a turning point of the bus route is created and incorporated into the status information.

In one embodiment, the information on bus operation interval includes information on day of the week or time of day to which the bus operation interval applies in addition to the bus operation interval itself.

In one embodiment, each information block containing the information on buses to arrive includes identification information for a bus stop, information on the operation status of buses to arrive at the bus stop, and longitude/latitude coordinates of the bus stop.

In one embodiment, the information on the operation status of buses to arrive includes the number of buses to arrive, route identification information, predicted arrival time, and the current location for each of the buses to arrive.

In one embodiment, the information on the location of each bus in operation or each bus expected to arrive is expressed by one type of information among a number sequentially assigned to each bus stop located on a bus route, an identifier uniquely assigned to each bus stop located within an area in which the public transportation information is serviced, an identifier uniquely assigned to each section located within an area in which the public transportation information is serviced, a pair of numbers each of which is sequentially assigned to each bus stop located on a bus route, and a pair of identifiers each of which is uniquely assigned to each bus stop located within an area in which the public transportation information is serviced.

In one embodiment, the value of the identifier assigned to the first component varies depending on the way the location information is specified.

4. BRIEF DESCRIPTION OF THE DRAWINGS

FIG. 3 illustrates the syntax of the message management container according to the message structure shown in FIG. 2;

FIG. 4 illustrates the syntax of the component constituting the application status container according to the message structure shown in FIG. 2;

FIGS. 6A through 6O illustrate the syntaxes of major elements of the format shown in FIG. 5;

FIGS. 7A through 7C illustrate several information types used to encode public transportation information according to preferred embodiments of the invention;

FIG. 8 illustrates a table of codes for defining public transportation information system according to one embodiment of the invention;

FIGS. 10A through 10E illustrate the syntaxes of major elements of the format shown in FIG. 9;

FIG. 10F illustrates the syntax of the components delivering additional information of the public transportation information according to one embodiment of the invention;

FIG. 11 illustrates a schematic diagram of a terminal in accordance with one embodiment of the invention for receiving the public transportation information provided by a transportation information providing server;

FIGS. 12A and 12B illustrate the way the public transportation information received according to the formats shown in FIG. 5 and/or FIG. 9 is stored in the terminal shown in FIG. 11.

5. BEST MODE FOR CARRYING OUT THE INVENTION

In order that the invention may be fully understood, preferred embodiments thereof will now be described with reference to the accompanying drawings.

Figure 1A:
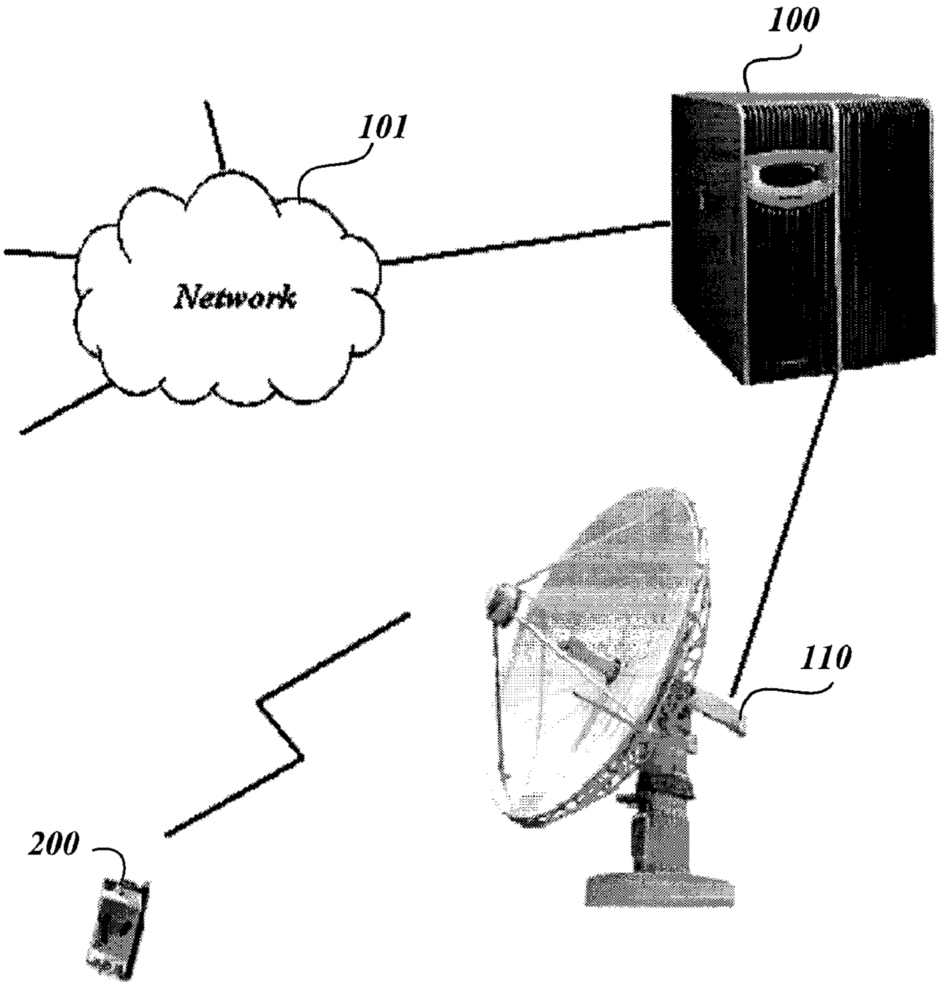
FIG. 1A illustrates a brief schematic diagram of a network through which public transportation information is provided in accordance with the present invention.

FIG. 1A is a brief schematic diagram of a network through which traffic information (e.g., bus service information) is provided in accordance with the present invention. A transportation information providing server 100, which collects traffic information from several sources such as operator input or other servers via a network 101, reconstructs and transmits the information wirelessly via a wireless signal transmitter 110 so that users of a portable public transportation information receiving terminal 200 (hereinafter referred to as the terminal) can receive the information.

The public transportation means (e.g., buses) on which the traffic information is provided transmits information on the position thereof to a bus traffic information collecting server (not illustrated) via a different wireless network on a regular basis. The bus traffic information collecting server transmits the collected information to the transportation information providing server 100 in real time. It is possible that the transportation information providing server 100 also plays the role of the bus traffic information collecting server.

Figure 2:
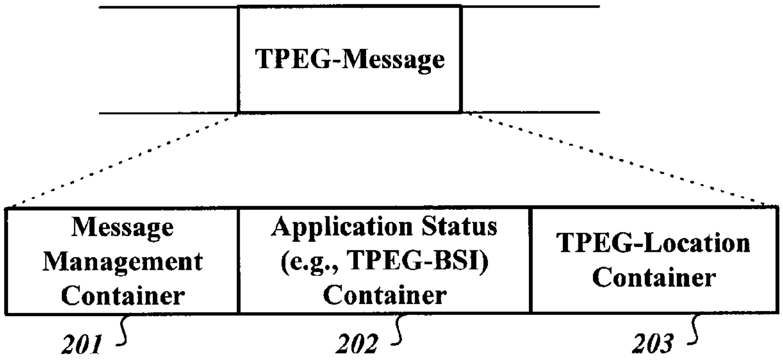
FIG. 2 illustrates the structure of a TPEG message containing public transportation information.

The public transportation information wirelessly transmitted by the transportation information providing server 100 is a sequence of TPEG (Transport Protocol Expert Group) messages. As shown in FIG. 2, a TPEG message contained in the sequence comprises a message management container 201, an application status container 202, and a TPEG location container 203. In the present invention, bus service information is delivered by the application status container 202 and thus the application status container 202 is also referred to as the TPEG-BSI (bus service information) container. The selection of the name of the application status container 202 is irrelevant to the spirit of the invention and therefore the application status container may be named differently. Likewise, other components of the message may be named differently.

Figure 1B:
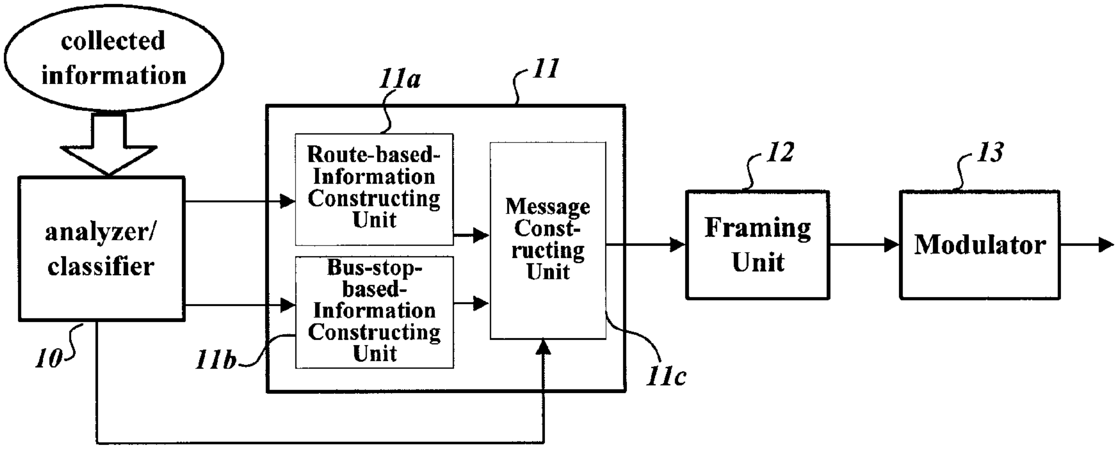
FIG. 1B illustrates a schematic diagram of an apparatus for encoding public transportation information in accordance with one embodiment of the invention.

The apparatus for encoding the public transportation information as shown in FIG. 2 comprises an analyzer/classifier 10 for analyzing and classifying collected traffic information, a BSI encoder 11 for encoding the information analyzed/classified by the analyzer/classifier 10 into TPEG messages according to a message syntax to be described later, a framing unit 12 for framing the TPEG messages by dividing the TPEG messages appropriately and appending header information and CRC data for error correction to the divided TPEG messages, and a modulator 13 for modulating the output of the framing unit 12 according to a predetermined method, as shown in FIG. 1B. The analyzer/classifier 10 and BSI encoder 11 are implemented in the public transportation information providing server 100 as hardware or software. The modulator 12 is implemented in the wireless signal transmitter 110. The framing unit 12 can be implemented either in the public transportation information providing server 100 or in the wireless signal transmitter 110. Alternatively, the framing unit 12 may be implemented in a separate server (not illustrated) for collecting and providing various types of TPEG application information, in which case the separate server receives public transportation information from the public transportation information providing server 100, constructs frames using the received information along with different types of application information, and provides the constructed frames for the modulator 13 of the wireless signal transmitter 110.

The BSI encoder 11 comprises a route-based-information constructing unit 11*a*, a bus-stop-based-information constructing unit 11*b*, and a message constructing unit 11*c*. The route-based-information constructing unit 11*a* constructs components of route-based information (e.g., information on the location of each bus running on a bus route, the list of bus stops located on a bus route, etc) classified by the analyzer/classifier 10, the constructed components having a hierarchical structure according to a given syntax. The bus-stop-based-information constructing unit 11*b* constructs components of bus-stop-based information (e.g., information on the location of each bus to arrive at a bus stop, predicted arrival time of each bus, etc) classified by the analyzer/classifier 10, the constructed components having a hierarchical structure according to a given syntax. The message constructing unit 11*c* constructs each TPEG message by creating the application status container 202 by storing the components constructed by the route-based-information constructing unit 11*a* and the bus-stop-based-information constructing unit 11*b* therein and the message management container 201 by storing necessary information therein.

The message constructing unit 11*c* may create components of additional information (e.g., area information), which is not classified as route-based information or bus-stop-based information by the analyzer/classifier 10, and store the created components in the application status container 202. Also, if location-related information is required in each TPEG message, the message constructing unit 11*c* may create a TPEG location container 203 to be included in each TPEG message as shown in FIG. 2.

The public transportation information and the way the BSI encoder 11 encodes the public transportation information according to the present invention will now be described in detail.

When constructing the message management container 201, the BSI encoder 11, more specifically, the message constructing unit 11*c*, writes information therein according to the syntax shown in FIG. 3. The information written in the message management container 201 includes a message ID, the version of the provided service, message creation time 302, etc. The message creation time 302 is optional depending on the value of a selector 301. The information may also include the current date and time. A field 303, which is 2 bytes long (intunli: integer unsigned little) and indicative of the data length, stores the length of data following the field 303.

The application status container 202 and TPEG location container 203 comprise at least one BSI component according to the syntax shown in FIG. 4. The most significant bit (MSB) of the selector 301 included in the message management container 201, which is 1 byte long (intunti: integer unsigned tiny), is set if component data for BSI follows. As shown in FIG. 4, the field indicative of the length of data contained in each BSI component is 2 bytes long (intunli).

When constructing component data, the BSI encoder 11 writes a 1-byte identifier indicative of the type of each component therein, as shown in FIG. 4. In one embodiment of the invention, the identifiers of components carrying route-based bus information are set to 0x80 or 0x87, the identifiers of components carrying bus-stop-based bus information are set to 0x88, and the identifiers of components carrying the TPEG location container 203 are set to 0xB0.

As mentioned above, the transportation information providing server 100 may construct and provide either route-based bus service information or bus-stop-based bus service information.

A preferred embodiment of the present invention that constructs components of public transportation information based on bus routes will now be described in detail.

In the following description, a notation of the form locNN_ii is used wherein both NN and ii are numbers. locNN_ii means the value ii of a table named locNN, one of many loc tables pre-stored in the terminal 200 or one of many hard-coded loc tables. The meaning thereof is pre-defined between the BSI encoder 11 and the terminal 200. Another notation of the form bsiNN_ii can be interpreted in the same manner except that it represents the value ii of a BSI table. Likewise, the meaning thereof is pre-defined between the BSI encoder 11 and the terminal 200. The preferred embodiments of the present invention use some of the tables defined in the TPEG standard.

The present invention, however, is not confined to a specific standard and any tables newly defined between public transportation information sources and the terminal 200 can be used.

Figure 5:
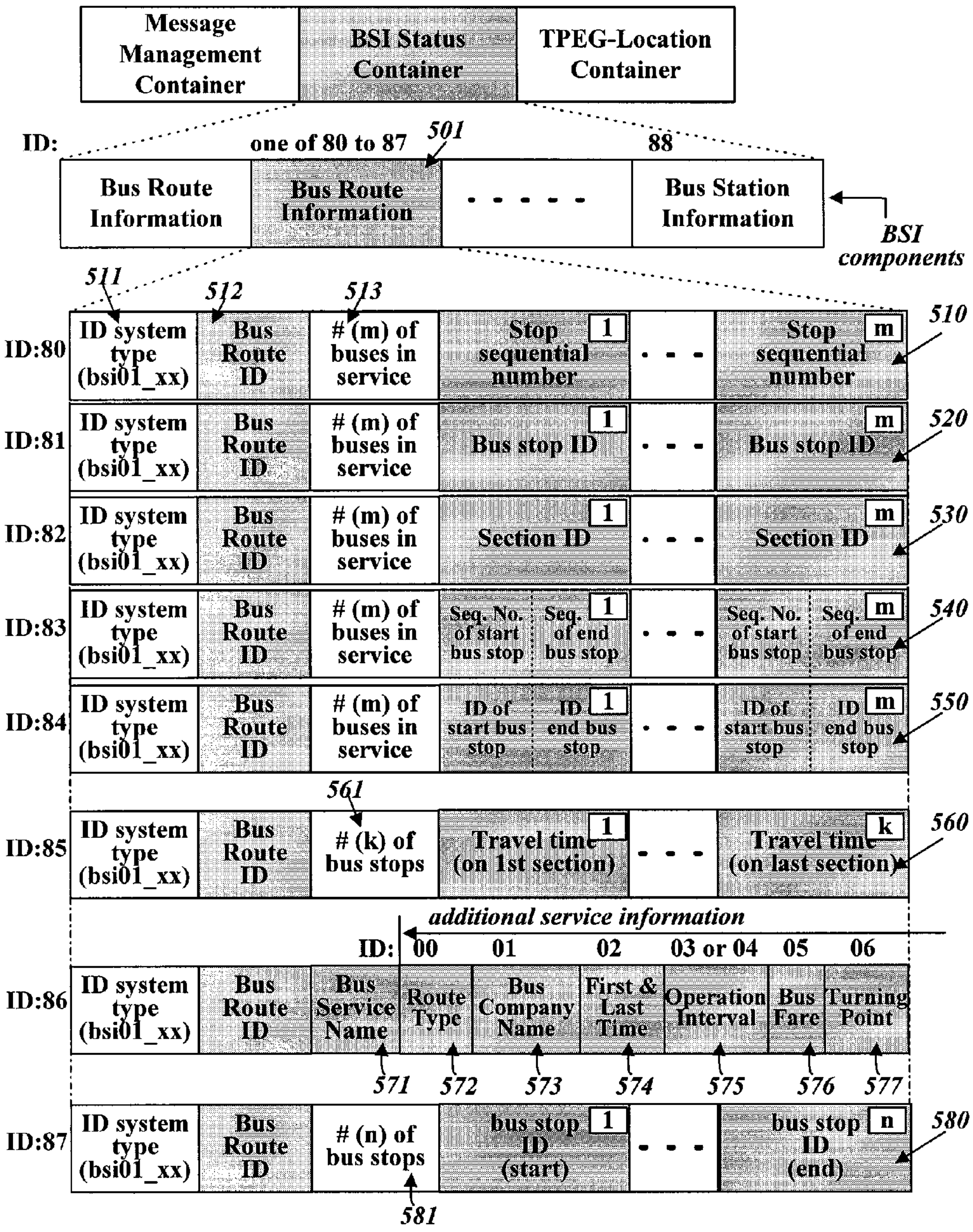
FIG. 5 illustrates the format of the TPEG message of the public transportation information according to one embodiment of the invention with focus on the application status container.

The BSI encoder 11, more specifically, the route-based-information constructing unit 11*a*, creates BSI components carrying bus route information 501, which have an identifier of 0x80 or 0x87 and follow the syntax shown in FIG. 5, and stores the created BSI components in the application status container 202. The application status container 202 may also deliver BSI components carrying bus stop information having an identifier of 0x88 created by the bus-stop-based-information constructing unit 11*b*, which will be described later.

The bus route information 501 comprises a set of components having at least one component among a bus-stop-sequential-number-based bus location component, a bus-stop-ID-based bus location-component, a section-ID-based bus location component, a bus-sequential-number-identifying-section-based bus location component, a bus-stop-ID-identifying-section-based bus location component, a section travel time component, a route additional information component, and a bus stop list component. The bus-stop-sequential-number-based bus location component is a BSI component having an identifier of 0x80 and delivers information on the current location of each bus running on a bus route using a bus stop sequential number. The bus-stop-ID-based bus location-component is a BSI component having an identifier of 0x81 and delivers information on the current location of each bus running on a bus route using a bus stop ID. The section-ID-based bus location component is a BSI component having an identifier of 0x82 and delivers information on the current location of each bus running on a bus route using a section ID. The bus-sequential-number-identifying-section-based bus location component is a BSI component having an identifier of 0x83 and delivers information on the current location of each bus running on a bus route using the sequential numbers of two consecutive bus stops located at both ends of a section. The bus-stop-ID-identifying-section-based bus location component is a BSI component having an identifier of 0x84 and delivers information on the current location of each bus running on a bus route using the IDs of two consecutive bus stops located at both ends of a section. The section travel time component is a BSI component having an identifier of 0x85 and delivers information on the time required to travel along each section comprising two consecutive bus stops located on a bus route. The route additional information component is a BSI component having an identifier of 0x86 and delivers additional information on a bus route. The bus stop list component is a BSI component having an identifier of 0x87 and delivers information on the list of the IDs of bus stops located on a bus route.

The bus-stop-sequential-number-based bus location component, which has the syntax shown in FIG. 6A, includes information indicative of the used bus information system (e.g., the rule for assigning bus stop IDs, section IDs, route IDs, etc) bsi01_xx 511, a 4-byte (intunlo: integer unsigned long) bus route ID 512 for uniquely identifying each bus route, the number of buses currently running on the bus route 513, and as many bus-stop-sequential-number-based bus information fields 510 as the number of the currently running buses. Each bus-stop-sequential-number-based bus information field 601, which has the syntax shown in FIG. 6A, stores the sequential number of a bus stop at which a bus is currently located or the sequential number of a bus stop nearest to the current location of a bus. The bus stop sequential number is a number sequentially assigned to each of the bus stops on a bus route along the bus running direction. The meaning of the value of bsi01_xx is shown in FIG. 8. In another embodiment of the invention, the bus-stop-sequential-number-based bus information field 601*a* not only stores the sequential number of a bus stop at which a bus is currently located or the sequential number of a bus stop nearest to the current location of a bus but also stores an predicted arrival time of the bus at the next bus stop, the predicted arrival time being 2 bytes long and expressed in seconds.

The bus-stop-ID-based bus location component, which has the syntax shown in FIG. 6B, includes information indicative of the used bus information system bsi01_xx, a 4-byte (intunlo: integer unsigned long) bus route ID for uniquely identifying each bus route, the number of buses currently running on the bus route, and as many bus-stop-ID-based bus information fields 520 as the number of the currently running buses. Each bus-stop-ID-based bus information field 602, which has the syntax shown in FIG. 6B, stores the ID of a bus stop at which a bus is currently located or the ID of a bus stop nearest to the current location of a bus. The bus stop ID is a number, a code, or a combination thereof uniquely assigned to each of the bus stops within an area in which the public transportation information service is provided. Unlike the 1-byte bus stop sequential number, the bus stop ID is 4 bytes long because the bus stop ID should be able to represent more bus stops than the bus stop sequential number. In another embodiment of the invention, the bus-stop-ID-based bus information field 602*a* not only stores the ID of a bus stop at which a bus is currently located or the ID of a bus stop nearest to the current location of a bus but also stores an predicted arrival time of the bus at the next bus stop, the predicted arrival time being 2 bytes long and expressed in seconds.

The section-ID-based bus location component, bus-sequential-number-identifying-section-based bus location component, and bus-stop-ID-identifying-section-based bus location component have the syntaxes shown in FIGS. 6C, 6D, and 6E, respectively. All of these components also include information indicative of the used bus information system bsi01_xx, a bus route ID for uniquely identifying each bus route, and the number of buses currently running on the bus route. The section-ID-based bus location component additionally includes a bus information field 530 (603) which expresses the current location of a bus using a 4-byte section ID. The bus-sequential-number-identifying-section-based bus location component additionally includes a bus information field 540 (604) which expresses the current location of a bus using a pair of bus stop sequential numbers. The bus-stop-ID-identifying-section-based bus location component additionally includes a bus information field 550 (605) which expresses the current location of a bus using a pair of bus stop IDs.

In another embodiment of the invention, the bus information field 603*a* which expresses the current location of a bus using a section ID included in the section-ID-based bus location component additionally stores a predicted arrival time of the bus at the next bus stop as shown in FIG. 6C. Likewise, the bus information field 604*a* which expresses the current location of a bus using a pair of bus stop sequential numbers included in the bus-sequential-number-identifying-section-based bus location component and the bus information field 605*a* which expresses the current location of a bus using a pair of bus stop IDs included in the bus-stop-ID-identifying-section-based bus location component additionally store a predicted arrival time of the bus at the next bus stop as shown in FIG. 6D and FIG. 6E, respectively. The predicted arrival time is 2 bytes long and expressed in seconds as mentioned before. Because the section-ID-based bus location component, bus-sequential-number-identifying-section-based bus location component, and bus-stop-ID-identifying-section-based bus location component express the location of a bus based on a section comprising two bus stops, the predicted arrival time included in the bus information fields 603*a*, 603*b*, and 603*c* is the predicted arrival time at the destination of the corresponding section.

The BSI encoder 11 determines the most appropriate bus location component type for a bus route in consideration for the current situation and creates bus location components of the type. For example, if the number of buses standing at bus stops is more than that of buses running between bus stops, the BSI encoder 11 creates the bus-stop-sequential-number-based bus location component with a view to improving the accuracy of the information on bus locations and provides the created bus location components for terminals. Because the bus-stop-ID-based bus information field is longer than the bus-stop-sequential-number-based bus information field, the size of required data can be reduced by selecting the bus-stop-sequential-number-based bus location component. If there are no bus stop sequential numbers defined between the BSI encoder 11 and the terminal, the BSI encoder 11 creates the bus-stop-ID-based bus location component. If the number of buses standing at bus stops is less than that of buses running between bus stops, the BSI encoder 11 creates the section-ID-based bus location component, bus-sequential-number-identifying-section-based bus location component, or bus-stop-ID-identifying-section-based bus location component with a view to improving the accuracy of the location information. However, in the case where the reduction of data size is prioritized than the accuracy of the location information, the BSI encoder 11 can create the bus-stop-sequential-number-based bus location component.

To transmit the time required to pass through each section comprising two consecutive bus stops along a bus route, the BSI encoder 11 creates the section travel time component, i.e., a BSI component having an identifier of 0x85, according to the syntax shown in FIG. 6F. The section travel time component includes information indicative of the used bus information system bsi01_xx, a bus route ID for uniquely identifying each bus route, the number of bus stops located along the bus route 561, and the section travel time fields 560 indicative of the time required to pass through each section along the bus route. The section travel time component includes the time required to pass through each section starting from the first bus stop on the bus route sequentially but does not allocate each of the sections a unique ID, thereby effectively reducing the size of data to transmit. The number of bus stops 561 does not include the first bus stop on the bus route and therefore the number of section travel time fields is equal to the number of bus stops 561.

In another embodiment of the invention, the number of bus stops 561 includes the first bus stop on the bus route. In this case, the number of bus stops 561 is one more than the number of section travel time fields and the public transportation information receiving terminal decodes as many section travel time fields as the number of bus stops 561 minus 1.

To transmit additional information on a bus route, the BSI encoder 11 creates the route additional information component, i.e., a BSI component having an identifier of 0x86, according to the syntax shown in FIG. 6G. The route additional information component includes information indicative of the used bus information system bsi01_xx, a bus route ID for uniquely identifying the bus route, a bus service name 571, and at least one additional service information fields. The bus service name 571 is a bus number indicative of the bus route or information comprising the bus number and destination of the bus. Alternatively, the bus service name 571 may a combination of the bus company name and other types of information.

The additional service information field may include a bus route type 572, a bus company name 573, the scheduled time for the first and last buses running on the bus route 574, a bus operation interval 575, a bus fair 576, and a turning point of the bus route 577 as well as an identifier indicative of the information type.

The bus route type 572, which has the syntax shown in FIG. 6H, has a value such as 'inter-city', 'main line' (or 'main'), or 'branch line' (or 'branch') depending on the type of the bus route.

The bus company name 573, which has the syntax shown in FIG. 6I, stores the name of the bus company as a character string less than or equal to 255 bytes (short string type).

The time for the first and last buses running on the bus route 574, which has the syntax shown in FIG. 6J, has two fields 611 for storing the first bus time and the last bus time, both of which are of the type <specific_&_iterative_time> shown in FIG. 7A.

The type <specific_&_iterative_time> the syntax of which is shown in FIG. 7A has a selector of bitswitch type. Each bit of the selector has a corresponding 1-byte value that follows the selector if the bit is set to 1. If two or more bits of the selector are set to 1, two or more bytes follow the selector, in which case data associated with lower significant bits of the selector appear earlier. For example, if the data of the type <specific_&_iterative_time> is "58 h 07 h 15 h", three bits of the selector (58h) are set to 1. The meaning of each bit of the selector is shown in FIG. 7A. In this example, the selector 58h indicates that fields which are not specified use the current date and time and that hour and minute values follow the selector. Because the bit corresponding to hour is closer to the LSB than the bit corresponding to minutes and each of the fields corresponding to hour, minute, and second stores a value 1 more than the actual value, the following data "07 h 15 h" indicates that 6 o'clock and 20 minutes. Other fields such as seconds, day of the month, and year are taken from the current date and time. As a result, if the current date is Oct. 12, 2006, the values of "58 h 07 h 15 h" mean that 6:20 Oct. 12, 2006. In another example, if the data of the type <specific_&_iterative_time> is "50 h 15 h", it indicates that fields which are not specified use the current date and time and that minute value follows the selector. In this case, if the current date and time is 6 o'clock Oct. 12, 2006, the data mean 6:20 Oct. 12, 2006. The transportation information providing server 100 encodes the time for the first and last buses in this manner and stores the encoded data in the corresponding field 611.

The time for the first and last buses 574 includes a field 612 indicative of day of the week in which the included time for the first and last buses applies. The information stored in the field 612 follows the syntax shown in FIG. 7B. As shown, the type <day_selector> defines a 1-byte value and each bit of the lower 7 bits thereof corresponds to a day of the week. The MSB of the value indicates whether the included time for the first and last buses repeats on the day of the week specified by the lower 7 bits thereof. For example, the 1-byte value of 01 h indicates that the time for the first and last buses applies on Sunday. Likewise, the 1-byte value of C0h indicates that the time for the first and last buses applies on every Saturday.

The bus operation interval 575 has the syntax shown in FIG. 6K or FIG. 6L. If the bus operation interval is always constant, the syntax shown in FIG. 6K is used. If the bus operation interval varies depending on day of the week or time of day, the syntax shown in FIG. 6L is used. The information on the bus operation interval is encoded according to the syntax shown in FIG. 7C.

The type <time_span> the syntax of which is shown in FIG. 7C has a selector of bitswitch type. Each bit of the selector has a corresponding 1-byte value that follows the selector if the bit is set to 1. If two or more bits of the selector are set to 1, two or more bytes follow the selector, in which case data associated with lower significant bits of the selector appear earlier. For example, if the data of the type <time_span> is "10 h 1Eh", one bit of the selector (10h) is set to 1 and the bit indicates that the value 1Eh following the selector means minute. As a result, the data "10 h 1Eh" means that the bus operation interval is 30 minutes.

If the bus operation interval varies depending on day of the week or time of day, the bus operation interval 575 follows the syntax shown in FIG. 6L, wherein information on day of the week or time of day in which the stored bus operation interval applies is included. If a specific time is specified, it means that the stored bus operation interval applies after the specified time. Each field of the type <day_selector> or <specific_&_iterative_time> is encoded in the aforementioned manner.

The bus fare 576 follows the syntax shown in FIG. 6M and includes 2-byte (intunli) information on the fare on the bus route. The turning point of the bus route 577 follows the syntax shown in FIG. 6N and includes information on the ID of the turning point bus stop.

To transmit information on the list of bus stops located on a bus route, the BSI encoder 11 constructs a bus stop list component, i.e., a BSI component having an identifier of 0x87, according to the syntax shown in FIG. 6O. The bus stop list component includes information indicative of the used bus information system bsi01_xx, a bus route ID for uniquely identifying the bus route, 1-byte information on the number of bus stops located on the bus route 581, and as many bus stop IDs 580 as the number of bus stops. The bus stops IDs are placed in order of the appearance of bus stops from the starting bus stop along the bus route.

The BSI encoder 11 applies different transmission frequencies to the section travel time component, route additional information component, and bus stop list component which deliver static information, i.e., information not subject to change for a long time (e.g., the list of bus stops, the bus operation interval, etc) and the bus location component which delivers dynamic information, i.e., information varying on a short time basis (e.g., the location of a bus). In other words, the BSI encoder 11 transmits the BSI components delivering static information in a regular interval (e.g., once a day, once a week, or once a month) or once after transmitting a predetermined number of bus location components.

In one embodiment of the invention, the information on the current location of each bus running on a bus route is delivered via one BSI component, i.e., one of the BSI components shown in FIGS. 6A through 6E. Consequently, if there are P bus routes in an area in which the public transportation information is serviced, information on the current location of each bus running on the P bus routes can be delivered by transmitting P bus location components.

In another embodiment of the invention, two or more types of components can be used to provide the information on the current location of each bus running on a bus route. In the case where the number of buses running on a bus route is N and n (n<N) buses are currently standing at bus stops, the information on the location of the n buses is delivered by a bus-stop-sequential-number-based bus location component or a bus-stop-ID-based bus location component and the information on the location of the remaining (N-n) buses that are currently running is delivered by a section-ID-based bus location component, a bus-sequential-number-identifying-section-based bus location component, or a bus-stop-ID-identifying-section-based bus location component. In this case, the syntaxes shown in FIGS. 6A through 6E has the number of types of included location information elements instead of or in addition to the field of the number of buses currently running on the bus route and the number of included location information elements following the field of the number of types of included location information elements is written therein.

The transportation information providing server 100 creates containers and components according to the syntaxes shown in FIGS. 3, 4, 6A through 6O, and 7A through 7C, constructs each TPEG message containing the created containers and components according to the format shown in FIG. 5, and transmits the constructed TPEG message to terminals wirelessly via the wireless signal transmitter 110.

A preferred embodiment of the present invention that constructs components of public transportation information based on bus stops will now be described in detail.

Figure 9:
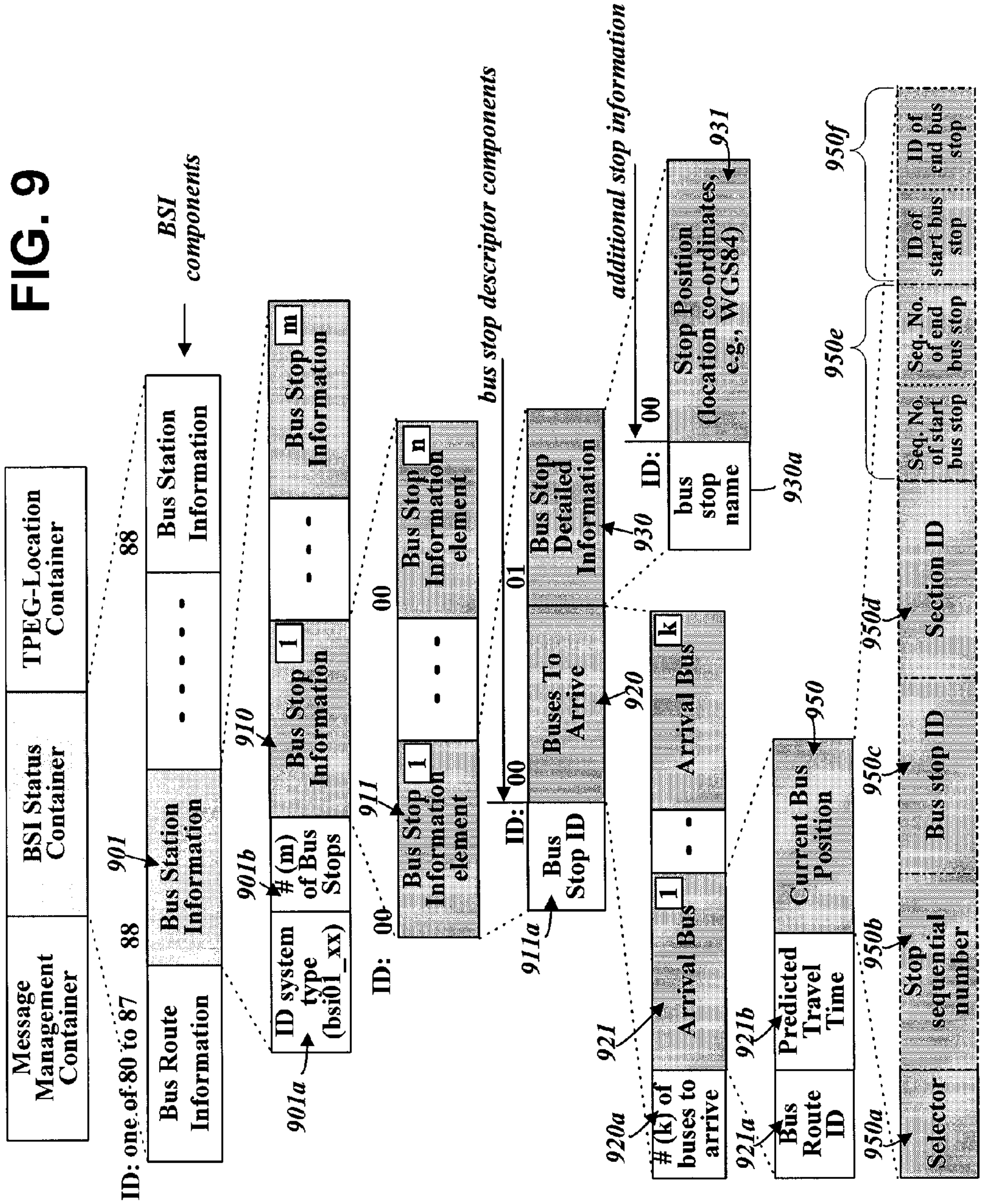
FIG. 9 illustrates the format of the TPEG message of the public transportation information according to another embodiment of the invention with focus on the application status container.

The BSI encoder 11, more specifically, the bus-stop-based-information constructing unit 11*b*, writes a bus station information component 901, i.e., a BSI component having an identifier of 0x88, according to the syntax shown in FIG. 10A in the application status component according to the format shown in FIG. 9. The application status container may also deliver BSI components carrying bus route information created by the bus-route-based-information constructing unit 11*a* as described above. The bus station information component 901 includes information indicative of the used bus information system bsi01_xx 901*a* as shown in FIG. 8, the number of bus stops 901*b*, and as many bus stop information fields 910 as the number of bus stops.

The BSI encoder 11 writes static information (e.g., the location of each bus stop, etc) and dynamic information (information on buses to arrive at each bus stop) on every bus stop located in the area in which the public transportation information is serviced in the bus station information component 901, i.e., the BSI component having an identifier of 0x88.

In another embodiment of the invention, all of the bus stops are divided into several groups and each group is allocated one bus station formation component 901. As a result, the public transportation information on every bus stop in the area is delivered by transmitting as many bus station information components as the number of the groups.

Each of the bus station information components 910 includes at least one bus stop information element. A bus stop information element having an identifier of 0x00 911, which has the syntax shown in FIG. 10B, is created for one bus stop and includes an ID 911*a* of the bus stop associated with the contained information and a plurality of bus stop descriptor components. The bus stop descriptor component delivers information on buses to arrive and bus stop detailed information depending on the identifier thereof.

The component of 'buses to arrive' 920, i.e., a bus stop descriptor component having an identifier of 0x00, has the syntax shown in FIG. 10C and includes information on the number of buses expected to arrive at the corresponding bus stop 920*a* and information on each bus to arrive 921. In one embodiment of the invention, the information on each bus to arrive 921 is created for each route of buses scheduled to arrive at the bus stop associated with the bus stop ID 911*a*. In other words, the information on each bus to arrive 921 is created only for the bus currently closest to the associated bus stop among buses running on each bus route. In another embodiment of the invention, the information on each bus to arrive 921 is created for a predetermined number of buses among buses running on each bus route in order of vicinity to the associated bus stop, the number of pieces of the information on each bus being equal to the predetermined number.

The information on each bus to arrive 921 includes the ID 921*a* of the bus route on which the bus to arrive runs, the predicted time required for the bus to arrive 921*b*, and the current location of the bus to arrive 950. The predicted time 921*b* is a time value coded according to the <time_span> type. As shown in FIG. 10C, the current location of the bus to arrive 950 includes a selector 950*a* indicative of the type of the following information and one type of information among bus stop information 950*b* having the format of the bus-stop-sequential-number-based bus information field 601 shown in FIG. 6A, bus stop information 950*c* having the format of the bus-stop-ID-based bus information field 602 shown in FIG. 6B, section information 950*d* having the format of the section-ID-based bus information field 603 shown in FIG. 6C, section information 950*e* having the format of the bus-sequential-number-identifying-section-based bus information field 604 shown in FIG. 6D, and section information 950*f* having the format of the bus-stop-ID-identifying-section-based bus information field 605 shown in FIG. 6E depending on the value of the selector 950*a*.

If the bus expected to arrive at the bus stop indicated by the bus stop ID 911*a* is standing at a bus stop, the location thereof can be provided by using the bus stop sequential number or bus stop ID, in which case the selector 950*a* is set to 01 h or 02 h. If the bus is running between bus stops, the location thereof can be provided by using the section ID with the selector set to 04 h. If the section ID is not defined, the location thereof can be provided by using a pair of sequential numbers or IDs of the bus stops located at both ends of the section, in which case the selector 950*a* is set to 08 h or 10 h. Even in the case where the section ID is defined, the bus location can be provided by using a pair of the bus sequential numbers (2 bytes) with the selector 950*a* set to 08 h instead of by using the section ID (4 bytes) for the purpose of reducing data size to transmit.

The bus stop detailed information 930, which is a bus stop descriptor component having an identifier of 0x01 and is a component or a set of components delivering detailed information on a bus stop, has the syntax shown in FIG. 10D and includes a bus stop name 930*a* and at least one piece of bus stop additional information. The bus stop additional information includes an identifier indicative of the type of contained information and a bus stop location 931. The bus stop location has the syntax shown in FIG. 10E and includes the longitude/latitude coordinates of the bus stop. The coordinates are coded according to the WGS84 or TM format.

In the aforementioned embodiment for providing bus-route-based public transportation information as well as the current embodiment, the transportation information providing server 100 can provide additional information for terminals via BSI components having the syntax shown in FIG. 10F. Such a BSI component has an identifier of 0x89 and delivers text information up to 65535 bytes and thus includes loc41_xx indicative of the language of the text and loc40_yy indicative of the country in which the transportation information is in service. The selection of the information table as shown in FIG. 8 depends on the language and country codes. The table shown in FIG. 8 is selected only when the country and language codes indicate Korea and Korean, respectively. If a different country language codes are specified, a table different from that shown in FIG. 8 is used for coding and decoding of the public transportation information.

The additional information component can deliver various types of information such as links to websites having public transportation related contents or additional description.

The transportation information providing server 100 creates containers and components according to the syntaxes shown in FIGS. 3, 4, 7A through 7C, and 10A through 10F, constructs each TPEG message containing the created containers and components according to the format shown in FIG. 9, and transmits the constructed TPEG message to terminals wirelessly via the wireless signal transmitter 110.

The terminal 200 shown in FIG. 1 for receiving public transportation information in accordance with the preferred embodiments of the invention may store basic information related to each bus stop ID and basic information related to each bus route ID in addition to the loc and BSI tables. The basic information related to each bus stop ID includes a bus stop type, a bus stop name, and longitude/latitude coordinates. The basic information related to each bus route ID includes a route name, a route type, IDs of the start and end bus stops, the number of bus stops, the arrival time of the first and last bus service at each bus stop, and the route shape information. The route shape information includes feature points of the route and the ID and longitude/latitude coordinates thereof, the feature points being selected such that the shape of the route can be shown on a VGA or QVGA display. If the static information on bus routes and bus stops stored in the terminal 200 conflicts with the information wirelessly provided from the transportation information providing server 100, the terminal 200 shows the received information to the user in preference to the stored information.

FIG. 11 shows a schematic diagram of the terminal 200 shown in FIG. 1 for receiving the public transportation information wirelessly transmitted by the transportation information providing server 100. The terminal 200 comprises a tuner 1, a demodulator 2, a TPEG-BSI decoder 3, a GPS module 8, a memory 4, an input device 9, a control engine 5, an LCD panel 7, and an LCD driver 6. The tuner 1 tunes to the frequency band in which the public transportation information is delivered and outputs modulated public transportation information. The demodulator 2 outputs a public transportation information signal by demodulating the modulated public transportation information. The TPEG-BSI decoder 3 obtains public transportation information by decoding the demodulated public transportation information signal. The GPS module 8 obtains the current position (longitude, latitude and altitude of the current position) based on signals received from a plurality of low-orbit satellites. The memory 4 stores the decoded public transportation information. The control engine 7 controls display output based on the user input, the current position, and the obtained public transportation information. The LCD driver 6 generates signals according to text or graphics to display for driving the LCD panel 7. The input device 9 may be a touch screen mounted on the LCD panel 7. The terminal 200 may further comprise a non-volatile memory storing an electronic map as well as the memory 4.

The tuner 1 tunes to the signal transmitted by the wireless signal transmitter 110 and the demodulator 2 demodulates the modulated signal received from the tuner 1. The TPEG-BSI decoder 3 extracts data frames from the demodulated signal, extracts public transportation information messages constructed as shown in FIGS. 2 through 5, 6A through 6O, 7A through 7C, and 10F and/or FIGS. 2, 3, 4, 7A through 7C, 9, and 10A through 10F from the data frames, stores the extracted public transportation information messages temporarily, interprets the stored TPEG BSI messages, and sends necessary information and/or control data obtained from the interpreted TPEG messages to the control engine 5. When interpreting the information contained in the BSI messages, the TPEG-BSI decoder 3 first reads the country code and/or language code delivered by the additional information component shown in FIG. 10F if available, and reads the value of bsi01_xx indicative of the used bus information system from the information table as shown in FIG. 8 specified by the country and language codes. The TPEG-BSI decoder then interprets the information contained in the BSI messages accordingly.

The TPEG-BSI decoder 3 determines whether to decode the received public transportation information based on the information contained in the message management container of each of the extracted TPEG BSI messages (e.g., version information) and decodes the following data based on the value of the selector. If the message creation time is contained in the message management container, the TPEG-BSI decoder 3 provides the control engine 5 with the creation time along with the information decoded from each TPEG BSI message. The control engine 5 uses the creation time information to determine whether to use the dynamic information received from the TPEG-BSI decoder 3. If the difference between the message creation time and the current time exceeds a predetermined value, the control engine 5 discards the dynamic information received from the TPEG-BSI decoder 3.

The control engine 5 constructs a route-based information table as shown in FIG. 12A in the memory 4 using the received data if the data received from the TPEG-BSI decoder 3 is route-based information, i.e., information decoded from a BSI component having an identifier of 0x80 or 0x87. If the data received from the TPEG-BSI decoder 3 is bus-stop-based information, i.e., information decoded from a BSI component having an identifier of 0x88, the control engine 5 constructs a bus-stop-based information table as shown in FIG. 12B in the memory 4. FIGS. 12A and 12B are simple illustrative examples and therefore the information table may further include additional information elements not illustrated in FIGS. 12A and 12B (e.g., a bus route type, a bus service company name, the time for the first and last buses, bus fare, bus stop coordinates, etc) or the decoded information may be stored in a structure different from the tables shown in FIGS. 12A and 12B.

In FIGS. 12A and 12B, the bus stop name is used as the bus stop identification information but this is only for explanation and the ID assigned to each bus stop is actually stored. When showing the information to the user, the terminal 200 reads the bus stop name stored in a memory in the terminal 200 or the name associated with the bus stop ID received from the transportation information providing server 100 and displays the bus stop name.

The column 1201 of 'the travel time along each section' shown in FIG. 12A is constructed by decoding the section travel time component shown in FIG. 5, i.e., a BSI component having an identifier of 0x85, and mapping the travel time along each section delivered by the component to each section beginning from the start bus stop. The column 1202 of 'the current bus location' is constructed by decoding the bus location component shown in FIG. 5, i.e., a BSI component having an identifier of 0x80 or 0x84.

In another embodiment of the invention, the information on the predicted time required for each bus to arrive at the next bus stop may be included in the bus location component. In this case, the information on the predicted arrival time at each bus stop may be constructed as a column in the table as shown in FIG. 12A. The information can be used to calculate the predicted time of arrival of a bus at a bus stop selected by the user. For example, if a bus on a selected route is located at a bus stop (Sk-3), 3 bus stops ahead of the user-selected bus stop (Sk), and the predicted arrival time of the bus at the next bus stop (Sk-2) is Tp, then the predicted arrival time of the bus at the user-selected bus stop (Sk) can be obtained by adding Tp, the travel time between bus stops Sk and Sk-1, and the travel time between bus stops Sk-1 and Sk-2.

In the column 1202 of the table shown in FIG. 12A, the value of 1 (Yes) indicates that a bus is standing at the selected bus stop and the value of 2 (pre-sect) indicates that a bus is running along the section the end bus stop of which is the user-selected bus stop. In the example shown in FIG. 12A, if the ID of the section comprising subway station 'Migum' as the start bus stop and 'KT' as the end bus stop or a pair of bus stop sequential numbers or IDs of the two bus stops are received as the information on the current location of the bus, the value of the current bus location for bus stop 'KT' is set to 2.

In the information table shown in FIG. 12B, the column 1211 of 'predicted arrival time' is constructed by adding the current time and the predicted time required for the bus to arrive 921*b* obtained by decoding the information on each bus to arrive 921 shown in FIG. 9. In another embodiment of the invention, the decoded time value can be directly stored in the table. The column 1212 of 'the current bus location' is constructed by decoding the current location of the bus to arrive 950 shown in FIG. 9. In the column 1212, the value of 0 or 1 indicates that the current bus location is referenced by a bus stop sequential number or bus stop ID, the value of 2 indicates that the current bus location is referenced by a section ID, and the value of 3 or 4 indicates that the current bus location is referenced by a pair of bus stop sequential numbers or a pair of bus stop IDs. The value is stored along with the decoded bus stop identification information (sequential number or bus stop ID) or section identification information (section ID, a pair of bus stop sequential numbers or bus stop IDs) in the column 1212.

Instead of constructing separate information tables shown in FIGS. 12A and 12B, the control engine 5 may construct an integrated information table for storing the route-based information and bus-stop-based information together. The public transportation information stored as shown in FIGS. 11A and 12B is updated each time new information is received from the transportation information providing server 100.

Instead of storing all data received from the TPEG-BSI decoder 3 in the memory 4, the control engine 5 may selectively store only dynamic data regarding bus stops near the current position identified by the GPS module 8 (e.g., bus stops located within a circle of a radius of 1 Km). The terminal 200 is likely to have a limitation in the memory size and the scheme of selectively storing information improves the efficiency of memory use. The static information is always stored even in this case.

Figure 13:
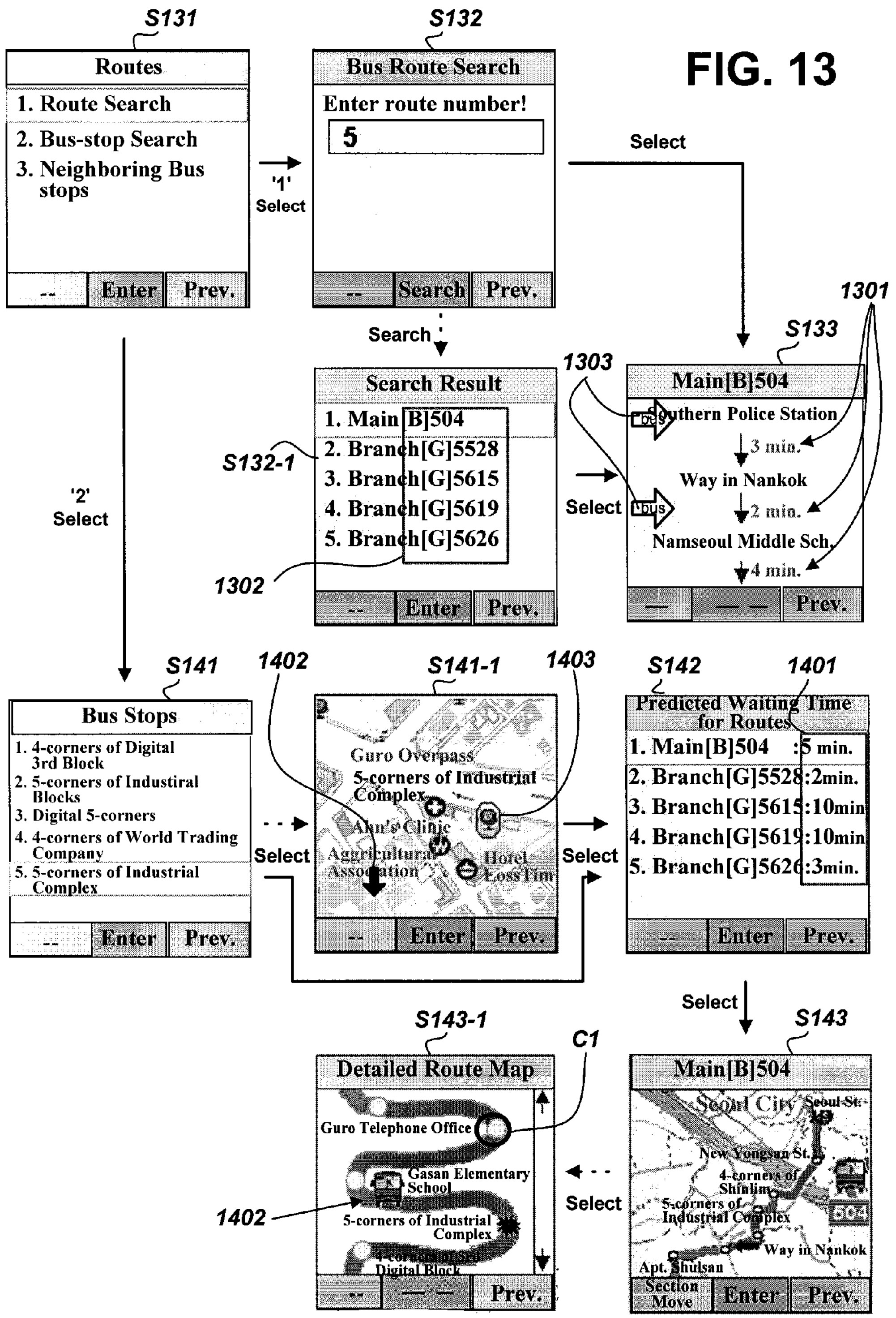
FIG. 13 illustrates exemplary screen images displaying information on bus stops and/or on bus routes in response to a user's request for public transportation information.

If the user requests public transportation information via the input device 9 when the received public transportation information is stored in the aforementioned manner, the terminal 200 displays a menu for allowing the user to select available public transportation information on the LCD panel 7 as shown in FIG. 13 (S131). If the user selects a bus route search from the displayed menu, the terminal 200 provides an input window through which the user can input a required route number. If a bus route is inputted (S132), the control engine 5 searches the memory 4 for information on each of the bus stops located on the selected bus route stored as shown in FIG. 12A and displays the name of each of the bus stops together with the route ID on the screen (S133). When displaying the route ID, the terminal 200 may perform an additional operation of appending symbols or text to the route ID for helping the user notice the route ID more easily. For example, if the route ID is B504, the terminal 200 combines text 'main line[ ]' (or main[ ]) with the route ID and displays 'main line[B]504 ' (or main[B]504) on the screen. The terms of 'branch' and 'inter-city' may be displayed respectively in connection with alphabets 'G' and 'R' preceding the line number instead of those alphabets. The control engine 5 reads travel time between bus stops from the column 1201 of the information table shown in FIG. 12A and displays the travel time between the bus stop names (1301) on the screen.

The names of the bus stops on the bus route are displayed on the screen in the order that the information on the bus stops is listed in the stored basic information on the bus route or the identifiers of the bus stops are listed in the received bus stop list component (i.e., the BSI component having an identifier of 0x87) (S133).

When displaying the bus stops names, the terminal 200 may show the current location of each bus running on the route on the screen by marking the places corresponding to the current locations of the running buses with a particular symbol 1303 after reading the location information from the column 1202 of the information table shown in FIG. 12A. If a bus is located between bus stops (i.e., the corresponding value in the column 1202 is set to 2), the particular symbol 1303 indicative of the bus location is displayed in the section having the two bus stops as its both ends.

If the user inputs a part of route identification information (e.g., a part of a route ID), there may be multiple route IDs part of which match the inputted information. In this case, the control engine 5 searches the route-based information table stored as shown in FIG. 12A for all route IDs part of which match the user input and enumerates the entire found route IDs 1302 with optionally appending symbols or text (S132-1). If one route is selected from among the enumerated route IDs, the terminal 200 displays information on bus stops located on the selected bus route and travel time between two bus stops (S133).

If the user selects a search for bus stops instead of a search for bus routes from the public transportation information related menu (S131), the control engine 5 searches the memory 4 for bus stops located within a predefined radius (e.g., 1 Km) from the current position identified by the GPS module 8 and displays the list of the found bus stops on the LCD panel 7 (S141). In another embodiment of the invention, the names of all bus stops are displayed in alphabetical order and the user is requested to select one bus stop from the list.

If the user selects one bus stop from the displayed list via the input device 9, the control engine 5 obtains the predicted arrival time of an incoming bus running on each bus route passing the selected bus stop, which is stored in the column 1211 of the information table stored as shown in FIG. 12B in the memory 4 and enumerates the predicted waiting time 1401 (the value obtained by subtracting the current time from the predicted arrival time) along with the ID of each bus route on the screen (S142). The information on the current location of the incoming bus on each bus route may be obtained from the column 1212 of the information table stored as shown in FIG. 12B and displayed in response to other selection keys or a move key.

If the terminal 200 is equipped with a non-volatile memory (hereinafter referred to as storage means) storing an electronic map and one bus stop is selected from the list of bus stops (S141), the terminal 200 reads a part of the electronic map around the selected bus stop and displays the part on the LCD panel 7 via the driver 6 (S141-1). In this case, the current location is marked with a specific graphic symbol 1402 and the selected bus stop is also marked with another graphic symbol 1403 and description information on the displayed electronic map. If "select" key is inputted while the electronic map around the selected bus stop is displayed, the information on bus routes passing the selected bus stop is displayed (S142).

If the user selects one bus route while the list of bus routes passing the selected bus stop is displayed (S142), the control engine 5 reads the route shape information and information on bus stops located on the bus route from the memory 4 and/or another memory and displays the information (S143), thereby helping the user determine if the bus route is really headed for the user's destination. If the terminal 200 is equipped with the storage means, the control engine 5 displays the shape of the bus route on the electronic map. If the user selects "detailed information" or "select", the control engine 5 magnifies the displayed electronic map around the selected bus stop (S143-1). When displaying a part of a bus route in detail, the terminal 200 reads information on the current location of the bus expected to arrive at the bus stop from the column 1212 of the information table stored as shown in FIG. 12B and displays a specific icon (e.g., bus icon 1402) at the corresponding position on the displayed map, thereby helping the user notice the location of the bus visually. The location of the bus expected to arrive is specified by a bus stop sequential number, a bus stop ID, a section ID, a pair of bus stop sequential numbers, or a pair of bus stop IDs. If a bus is located between bus stops, the bus icon 1402 is displayed in the section having the two bus stops as its both ends.

The terminal 200 can provide various types of additional information (e.g., bus route type, bus company name, the time for the first and last buses, bus operation interval, bus fair, etc) received from the transportation information providing server 100 as well as the aforementioned information for the user if the user selects the additional information via a menu provided by the terminal 200.

In the preferred embodiments, the terminal 200 shown in FIG. 11 may be equipped with voice output means. In this case, when the user selects one bus stop and one route from among all bus routes passing the bus stop, the terminal 200 may generate a voice output reporting the predicted arrival time of an incoming bus or when the user selects a bus route and a bus stop belonging to the bus route, the terminal may generate a voice output reporting the name of a bus stop at which an incoming bus is located. It is also possible to generate a voice output reporting other types of information. The voice output means has data required for voice synthesis.

At least one embodiment of the invention described thus far enables users to estimate how long it will be before next public transportation means arrives and its availability, thereby allowing the users to do some useful things instead of simply waiting. The present invention promotes the use of public transportation by providing information on real-time schedules available at any bus stop, thereby effectively reducing the use of private vehicles and economical or social cost required for construction or curing environmental pollution.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

The invention claimed is:

1. A method for processing traffic information, comprising:

encoding a traffic information including a system identifier for identifying a bus information system, an identification information for a bus route, and a travel time along each section between two consecutive bus stops belonging to the bus route; and transmitting the encoded traffic information.

2. The method of claim 1, wherein the traffic information further includes information on a country to which the information system identifier applies.

3. The method of claim 1, wherein the traffic information further includes information on a number of bus stops constituting the bus route.

4. The method of claim 1, wherein the traffic information further includes at least one type of information among a name of the bus route, a type of the bus route, a service company name of the bus route, a scheduled time for first and last buses on the bus route, information on a bus operation interval, a bus fare, and a turning point.

5. The method of claim 4, wherein the information on the bus operation interval includes not only the bus operation interval but also time duration to which the bus operation interval applies.

6. An apparatus for processing traffic information, comprising:

an encoder for creating an information system identifier for identifying a bus information system, an identification information for a bus route, and a travel time along each section between two consecutive bus stops belonging to the bus route; and a frame organizer for organizing frames by adding error correction data to data including the information created by the encoder.

7. The apparatus of claim 6, wherein the encoder further creates information on a number of the bus stops constituting the bus route.

8. The apparatus of claim 6, wherein the encoder creates the component such that the created travel times arranged in the component in order of appearance of bus stops along the bus route.

9. A method for processing traffic information at a terminal including a receiver and a decoder, comprising:

receiving a traffic information including at least one of traffic messages, wherein the traffic messages include:

a message management container including a message generation time, an event container including a system identifier for identifying a bus information system, an identification information for a bus route, and a travel time along each section between two consecutive bus stops belonging to the bus route, and a location container including a location information, decoding the received traffic information.

10. The method of claim 9, wherein the traffic information further includes information on a number of the bus stops constituting the bus route.

11. The method of claim 9, wherein the traffic information further includes at least one type of information among a name of the bus route, a type of the bus route, a service company name of the bus route, a scheduled time for first and last buses on the bus route, information on a bus operation interval, a bus fare, and a turning point.

12. The method of claim 11, wherein the information on the bus operation interval includes not only the bus operation interval but also time duration to which the bus operation interval applies.

13. An apparatus for processing traffic information, comprising:

a demodulator for demodulating a received signal to output a sequence of messages carrying public transportation information;

a decoder for extracting status information from each of the messages and extracting from the status information an information system identifier for identifying a bus information system, an identifier for a bus route, and public transportation information including a travel time along each section between two consecutive bus stops belonging to the bus route; and a controller for storing the extracted information in a storage means and outputting the stored information or a part of the stored information via an output unit depending on a given condition.

14. The apparatus of claim 13, further comprising a location detector for detecting information on a current location, wherein the controller stores static information of the extracted information in the storage means and stores dynamic information regarding only bus stops located near the current location in the storage means.

15. The apparatus of claim 13, wherein the decoder further extracts information on a number of bus stops constituting the bus route from the status information.

16. The apparatus of claim 13, wherein the decoder recognizes a travel time along each section on the bus route by making correspondence of the extracted travel times to bus stops constituting the bus route in order of appearance of the bus stops along the bus route.

17. The apparatus of claim 13, wherein the controller, responsive to an input for selecting a bus route, reads information on a plurality of bus routes including the selected bus route from the storage means, outputs a list of bus routes via the output unit, reads from the storage means travel time along each section between all bus stops or a part of bus stops belonging to a bus route selected from the list, and outputs the obtained travel time via the output unit.

18. The apparatus of claim 13, wherein the controller, responsive to an input for selecting a bus route, reads from the storage means information on a bus route that matches the selected bus route, reads from the storage means travel time along each section between all bus stops or a part of bus stops belonging to the selected bus route, and outputs the obtained travel time via the output unit.

19. The apparatus of claim 13, wherein the output unit presents the stored information or the part of the stored information visually or audibly.

20. The apparatus of claim 13, wherein the decoder decodes the extracted public transportation information based on the extracted information system identifier.

21. A method for processing traffic information, comprising:

encoding traffic information, the traffic information comprising a system identifier for identifying a bus information system, an identification information for a bus route, and a travel time along each section between two consecutive bus stops belonging to the bus route; and transmitting the encoded traffic information.

* * * * *